United States Patent [19]

Theriault

[11] 4,271,433
[45] Jun. 2, 1981

[54] SAW FILTER PREAMPLIFIER

[75] Inventor: Gerald E. Theriault, Hopewell, N.J.

[73] Assignee: RCA Corporation, New York, N.Y.

[21] Appl. No.: 97,041

[22] Filed: Nov. 23, 1979

[51] Int. Cl.³ .............................................. H04N 5/44
[52] U.S. Cl. ................................................. 358/191.1
[58] Field of Search ................. 358/188, 191.1, 196, 358/197; 330/302; 333/193; 310/313

[56] References Cited

U.S. PATENT DOCUMENTS

| | | |
|---|---|---|
| 4,006,290 | 2/1977 | Momberger et al. ............... 358/196 |
| 4,060,833 | 11/1977 | Onyshkevych ...................... 358/188 |
| 4,126,838 | 11/1978 | McCusker et al. .................... 333/72 |

OTHER PUBLICATIONS

Toshiba Television Schematic No. 105 Chassis 18T 43M, 1978.
General Television Schematic No. 71 Chassis M-14, 1979.
Murata Catalog No. P061E, 1979.

*Primary Examiner*—Robert L. Richardson
*Attorney, Agent, or Firm*—P. J. Rasmussen; W. H. Meagher; W. B. Yorks, Jr.

[57] ABSTRACT

A preamplifier is provided which couples a television tuner to a surface acoustic wave (SAW) filter and amplifies the I.F. signals supplied by the tuner so as to overcome the signal losses of the SAW filter. The preamplifier comprises a single transistor, the gain of which may be varied to provide desired gain and noise performance for the entire tuner-SAW filter-I.F. system. The gain of the preamplifier is simply adjusted by changing the values of one or two resistive components. The preamplifier includes a negative feedback path, which stabilizes the preamplifier against temperature variations, presents desired impedances to the tuner and SAW filter, and permits the substitution of a different transistor without the need for extensive readjustment. Means are provided for simply adjusting the biasing of the transistors without adversely affecting any previous gain adjustments. The biasing means also permits the most efficient operation of the preamplifier transistor by minimizing power dissipation and providing the highest available power handling capability in the preamplifier. The preamplifier may also include a tuned circuit which preshapes the I.F. signal response characteristic. The tuned circuit provides additional trapping of the adjacent channel sound signal, and an additional pole in the vicinity of the vestigial slope portion of the I.F. signal response characteristic.

19 Claims, 7 Drawing Figures

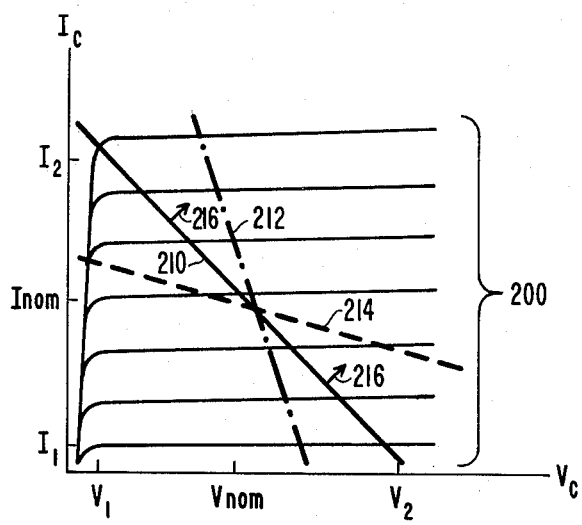
Fig. 4
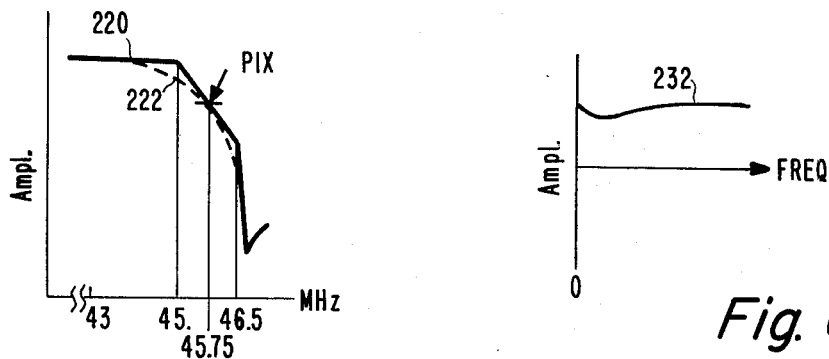
Fig. 5
Fig. 6
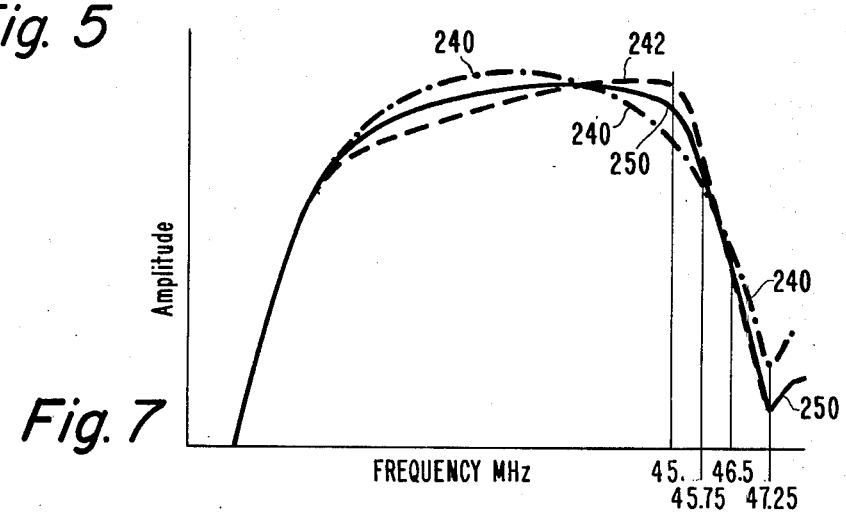
Fig. 7

SAW FILTER PREAMPLIFIER

This invention relates to the use of a surface acoustic wave (SAW) device to provide frequency selectivity of the desired intermediate frequency (I.F.) signals in a television receiver and, more particularly, to a preamplifier which is used to apply signals to a SAW device.

It is generally desirable, in a television receiver, to provide a certain amount of passband shaping to the broadband I.F. signals which are developed by the tuner. The passband shaping is necessary to prevent intermodulation of the various picture and sound signals, and to ensure that the selected I.F. signals will be amplified to the exclusion of unwanted signals. This is customarily accomplished by the use of a carefully designed network of reactive components prior to I.F. signal amplification. However, it has been discovered that the required selectivity can be provided by a surface acoustic wave filter which is constructed to provide the desired response. The SAW filter comprises a piezoelectric medium which propagates acoustic surface waves, an input transducer coupled to the medium for receiving an I.F. input signal and generating an acoustic surface wave in response thereto, and one or more output transducers, also coupled to the medium, for interacting with and receiving the propagated acoustic wave and generating an output signal. By appropriate selection of the medium material and the design of the transducers, a desired frequency selectivity characteristic may be obtained. The SAW filter can be fabricated by integrated circuit manufacturing techniques on a small rigid piezoelectric substrate, and the single device can replace most of the reactive components of the usual discrete selectivity network.

The SAW filter is not without its drawbacks, however. Typically, the output transducer will not adsorb all of the propagated acoustic wave energy; some of this energy passes through the output transducer and is dissipated at the edge of the substrate, and another portion is reflected back from the output transducer toward the input transducer. The input transducer similarly receives, passes and reflects proportionate amounts of the reflected wave energy, the reflected portion of which is progagated back to the output transducer. This secondary reflection is received by the output transducer as an error signal, referred to as a triple transit signal, which can produce an unacceptable level of distortion in the signal produced by the output transducer.

The loss of energy in the initially propagated acoustic wave at the output transducer is quite substantial, and can amount to upwards of eight db of the input signal energy. In addition, means must be provided for reducing the triple transit problem, which will also result in signal loss. The triple transit problem is generally overcome by mismatching the impedances at the input and output of the SAW device relative to the impedances of the input and output transducers. Specifically, the input transducer is driven by a low impedance, which is capable of absorbing the energy which is reflected back from the output transducer. Likewise, the output transducer is coupled to a low impedance load, which further attenuates the triple transit signal. The impedance mismatches necessary to reduce the triple transit signal to an acceptably low signal level can cause loss of approximately ten db of the input signal energy. Thus, the use of the SAW filter can result in approximately eighteen db of I.F. signal loss. This high signal loss limits the use of the SAW filter to those tuner and I.F. amplifier circuits which accommodate the signal loss through high gain, increased sensitivity, or both. Accordingly, it is desirable to provide means for overcoming this signal loss which permits the use of the SAW filter with any combination of currently available tuners and I.F. circuitry.

In accordance with the principles of the present invention, a preamplifier is provided which amplifies the I.F. signals supplied by the tuner so as to overcome the signal losses of the SAW filter. The preamplifier comprises a single transistor, the gain of which may be varied to provide desired gain and noise performance for the entire tuner-SAW filter-I.F. system. The preamplifier gain may be chosen by that the preamplifier-SAW filter combination has a net unity gain, which permits use of the combination with a wide variety of presently available tuners and I.F. circuits. The gain of the preamplifier is simply adjusted by changing the values of one or two resistive components. The preamplifier also includes a negative feedback path, which stabilizes the preamplifier against temperature variations and permits the substitution of a different transistor without the need for extensive readjustment.

In addition to providing the requisite gain, it is desirable to bias the preamplifier in a manner which provides linear operation and hence a low level of I.F. signal distortion. The biasing should also be readily adjustable and require few additional components. In accordance with a further aspect of the present invention, means are provided for simply adjusting the biasing of the transistor without adversely affecting any previous gain adjustments. The biasing means also permits the most efficient operation of the preamplifier transistor by minimizing power dissipation and providing the highest available power handling capability in the preamplifier.

Besides providing distortionless amplification of the I.F. signals, it is desirable for the preamplifier to exhibit selected input and output impedances. Typically, the I.F. signals are coupled to the preamplifier by a fifty ohm coaxial cable. As explained above, it is also necessary to drive the SAW filter from a low impedance. In accordance with another aspect of the present invention, individual resistive elements are used at the input and output of the preamplifier which, in cooperation with the feedback path, develop the necessary input and output impedances. These resistive elements permit impedance selection without adversely affecting previous gain and biasing adjustments, and can be selected in cooperation with the gain and biasing elements so as to minimize their number. Calculation of the value of the resistive element at the output of the preamplifier is simplified by use of a reactive element in the current supply path to the preamplifier, which eliminates the effect of the reactive component of the SAW filter input impedance in these calculations. It is then necessary to consider only the resistive component of the SAW filter input impedance in the adjustment of the preamplifier output impedance.

The transfer function exhibited by the SAW filter may be unacceptable in certain respects. For instance, the trapping of the adjacent channel sound carrier may not be sufficiently effective to prevent intermodulation distortion involving the remnant of this signal in subsequent signal processing stages in the television receiver. Moreover, the vestigial slope of the SAW filter response characteristic may be inadequately shaped, which can cause undesirable envelope modulation of the detected video signal. In accordance with yet a further aspect of the present invention, the preamplifier is provided with a tuned circuit which preshapes the I.F. signal response characteristic. The tuned circuit provides additional trapping of the adjacent channel sound signal, and an additional pole in the vicinity of the vestigial slope portion of the I.F. signal response characteristic. The adjacent channel sound carrier is therefore more completely eliminated from I.F. signals which are supplied to the succeeding I.F. circuitry. The composite response characteristic at the output of the SAW filter will also exhibit improved linearity of the vestigial slope portion of the characteristic, which minimizes the envelope modulation mentioned above.

In the drawings:

FIG. 4 is a graphic illustration of the biasing considerations used in explanation of FIGS. 1-3; and FIGS. 5-7 are graphic illustrations of the effects of the tuned circuits of FIGS. 2 and 3.

Figure 1:
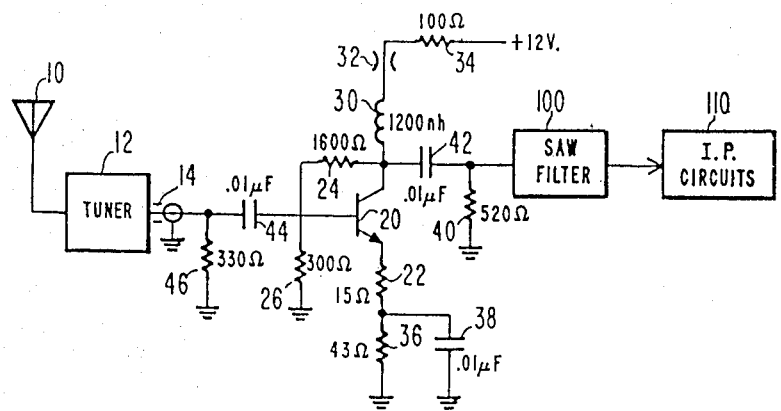
FIG. 1 illustrates, in schematic diagram form, a SAW filter preamplifier constructed in accordance with the principles of the present invention.

Referring to FIG. 1, a preamplifier of the present invention is shown in schematic detail, coupled between the tuner and SAW filter in a television receiver. Television signals are received by an antenna 10 and are coupled to a tuner 12. The tuner amplifies the received signals and converts them to intermediate frequency signals, with the signals of a selected channel occupying a predesignated range of frequencies. The I.F. signals are then coupled to the preamplifier by a coaxial cable 14.

The coaxial cable at the input of the preamplifier is coupled to a point of reference potential (ground) by an input impedance matching resistor 46. The signals supplied by the coaxial cable are also coupled to the base of a transistor 20 by a coupling capacitor 44. The base of the transistor 20 is coupled to ground by a resistor 26. The emitter of transistor 20 is coupled to ground by the series combination of a degeneration resistor 22 and a D.C. bias resistor 36. A bypass capacitor 38 is coupled in parallel with the bias resistor 36. The collector of transistor 20 is coupled to a source of supply potential (+12 volts) by the series combination of an inductor 30 and a resistor 34. The junction of the inductor 30 and the resistor 34 is coupled to ground by a feedthrough capacitor 32, which provides filtering of the supply voltage at that point. The collector of transistor 20 is also coupled to the base of the transistor by a feedback resistor 24, and to a SAW filter 100 by a coupling capacitor 42. A load resistor 40 is coupled between the junction of the coupling capacitor 42 and the SAW filter 100 and ground. The I.F. signals at the output of the SAW filter 100, which are located in the desired I.F. passband, are coupled to I.F. circuits 110 where they are amplified in preparation for subsequent detection, processing and reproduction of the audio and video information.

The preamplifier of FIG. 1 amplifies the I.F. signals supplied by the tuner 12 to substantially match the losses caused by the use of the SAW filter 100. The preamplifier also has an input impedance which matches that of the cable 14 from the tuner, and presents a low output impedance to the SAW filter to alleviate the triple transit problem. The gain of the preamplifier is controlled by the degeneration resistor 22 and the feedback resistor 24. The input impedance of the preamplifier is controlled by the degeneration resistor 22, the feedback resistor 24, and resistors 26 and 46, which are in shunt with the input of the preamplifier. The impedance presented to the SAW filter is governed by the output impedance of the transistor, the feedback resistor 24, and the load resistor 40, which is in shunt with the preamplifier output.

For any transistor amplifier, there is a condition of optimally biased operation for most efficient amplification and linear operation. This is illustrated graphically in FIG. 4. The transistor 20 has a family of characteristic curves 200. From these curves, the biasing conditions for most efficient operation may be determined. The power gain of the transistor is a function of the collector current and voltage of the biased transistor, and has an upward limit determined by the power dissipation of the device. By optimizing the collector voltage and current conditions, the power dissipation of the device is kept within the prescribed limit. Additionally, the collector voltage swing is limited by the voltage supply used. And it is necessary to operate the transistor 20 within its linear range, so that it neither cuts off nor saturates. Thus, the collector voltage swing can vary between a low level which is above cutoff, $V_1$, and an upper limit which is slightly less than twice the supply voltage, $V_2$. The upper limit can exceed the supply voltage when an inductive load, inductor 30, is used in the supply path. The collector voltage cannot attain a level of twice the supply level or be reduced to a very low level because of the voltage drops across resistors 34, 22, and 36, which are in series with the collector-to-emitter path. For the values given in the example of FIG. 1, the nominal voltage level $V_{nom.}$ at the center of the collector voltage swing is approximately ten volts when the +12 volt supply is used.

Given $V_{nom.}$, the collector current swing is chosen to have a nominal value $I_{nom.}$ in the middle of the range of linear operation. The collector current will swing from a low level $I_1$ above cutoff, to a high level $I_2$ which is below saturation. In the example of FIG. 1, $I_{nom.}$ is selected through D.C. biasing to be approximately 15 milliamps, centered between $I_1$ and $I_2$.

The optimum load line and quiescent operating point for transistor 20 is then calculated by dividing $V_{nom.}$ by $I_{nom.}$. In the example shown, load line 210 is the optimum load line, having a value of 666 ohms. As can be seen in FIG. 4, this optimum load line permits maximum voltage and current swings within the linear operating range of the transistor for the selected voltage supply. The quiescent operating point of the transistor is the intersection of $I_{nom.}$ and $V_{nom.}$ on the load line. Other load lines could be chosen which are less than optimum, leading to nonlinear operation of the transistor and hence a distorted output signal. For instance, load line 214 has a smaller current swing than load line 210 and is voltage limited at the upper (right) end of the voltage axis. Such a load line would cause clipping of the positive-going peaks of the output signal. Similarly, load line 212 has a smaller voltage swing than load line 210, and is current limited at the upper end of the current axis. This load line would produce distortion of the negative-going peaks of the output signal.

The optimum load line can also be located in a plane parallel to load line 210. Moving the load line upward and to the right as indicated by arrows 216, which could be done by increasing the power supply voltage, would increase the power handling capability of the transistor and maintain a wide range of linear operation. However, an upper limit of the power handling capability is approached as the maximum power dissipation of the device is neared at these higher power levels.

Referring to FIG. 1, it may be seen that the effective load of the transistor 20 comprises load resistor 40 in parallel with the input impedance of the SAW filter 100. In the example of FIG. 1, resistor 40 has a value of 520 ohms, and the SAW filter is assumed to have an input impedance which is slightly greater than 2,000 ohms. The inductor 30 is chosen to have a reactive impedance which matches the capacitive reactive input impedance of the SAW filter, thereby obviating the need to consider the capacitive component of the SAW filter input impedance in these calculations. Thus, only the resistive component of the SAW filter input impedance need be considered, thereby eliminating the effects of frequency-dependent impedances.

The above values show that the transistor 20 is driving a load of approximately 470 ohms, which is a departure from the optimum load line of 666 ohms. The actual load line of 470 ohms is tilted relative to load line 210 in FIG. 4, and lies between load lines 210 and 212. The departure from the desired load line is not a serious one, however, and the operation of the preamplifier is not significantly affected by the 470 ohm load line, which will be shown to provide virtually complete elimination of the triple transit problem.

As discussed above, the triple transit problem may be minimized by driving the SAW filter 100 from a low impedance. In the example of FIG. 1, the desired low impedance is approximately 250–300 ohms, which is significantly less than the 2,000 ohm input impedance of the SAW filter 100. The input impedance presented to the SAW filter by the preamplifier is calculated as the value of the load resistor 40 in parallel with the output impedance of the transistor 20. Without the A.C. feedback provided by resistor 24, the transistor 20 would exhibit an output impedance of several thousand ohms. Therefore, the requisite low impedance for the SAW filter would have to be provided by a low value resistor 40 of approximately 250–300 ohms. This low value resistor would shift the load line of the preamplifier as indicated by load line 212 of FIG. 4, causing current-limiting distortion in the preamplifier, as described above. However, the use of the feedback resistor 24 lowers the output impedance of the transistor to approximately 500 ohms, since the output impedance of the feedback-compensated transistor is effectively an inverse function of the feedback factor, $\beta$, of the transistor ($R_{of} = (R_o/1 + K\beta)$). Thus, the impedance presented to the SAW filter 100 is 500 ohms in parallel with the 520 ohm resistor 40, or approximately 250 ohms, which is achieved without markedly departing from the optimum load line of the transistor 20.

In the same way that the feedback resistor 24 acts to lower the output impedance of the transistor, the feedback resistor 24 and the degeneration resistor 22 operate to reduce the input impedance of the transistor 20 so as to match the impedance of the cable 14 from the tuner 12. In the example shown in FIG. 1, the cable 14 is assumed to have an impedance of 50 ohms. The cable sees an input impedance comprising the parallel combination of resistor 46, resistor 26, and the input impedance of the transistor 20. Without feedback, the input impedance of the transistor would be several hundred ohms, and the desired 50 ohm input impedance would have to be developed by using small values for resistors 46 and 26. Appropriate values for these resistors would severely load the input of the preamplifier, shunting away three db or more of the input signal from the tuner. However, the use of feedback lowers the input impedance of the transistor to approximately 60–70 ohms, permitting the use of resistors 46 and 26 with values of approximately 300 ohms. The resistors 46 and 26 will thus attenuate the input signal by only one db or less, thereby providing a higher signal level at the base of the transistor 20. It may even be possible to eliminate resistor 46 from the preamplifier, if that is desired. In the example shown in FIG. 1, the value of resistor 46 is chosen after the transistor 20 has been properly biased, and is only used to precisely adjust the input impedance of the preamplifier to 50 ohms.

The use of feedback in the preamplifier of FIG. 1 permits the substitution of different transistors for transistor 20 after the preamplifier has been constructed, without the need for readjustment of other component values. The gain of the preamplifier is, to a first approximation, a function of the feedback factor of the preamplifier. The feedback factor, $\beta$, is a function of the values of resistors 22 and 24. Thus, the substitution of transistors with differing parameters may be made without upsetting the operation of the preamplifier.

The use of feedback also provides improved thermal stability in the preamplifier. As the ambient temperature of the preamplifier increases during operation, the base-to-emitter voltage of the transistor will decrease, and the collector and emitter currents of the transistor 20 will increase. The increased collector current lowers the voltage at the collector of the transistor, which, by virtue of the feedback resistor 24, will result in a reduction of the bias voltage at the base of the transistor. The reduced base bias voltage reduces the gain of the transistor, which compensates for the thermal gain increase. In addition, the use of the bypassed resistor 36 in the emitter circuit of the transistor 20 minimizes the thermally-created gain change. The inclusion of resistor 36 increases the D.C. resistance between the emitter of transistor 20 and ground. Changes in the base-to-emitter voltage of the transistor with temperature change will cause a change in emitter current, which will result in only a small change in the voltage across these two resistors, and hence only a small change in emitter and collector current. The thermal shift in the operating point of the transistor, which will be compensated by the feedback, will thus be minimized.

The gain and the D.C. biasing of the preamplifier are determined by the choice of resistor values. The gain is adjusted by adjusting the values of the degeneration resistor 22 and the feedback resistor 24. D.C. biasing for the collector-to-emitter path is established by choosing the value of resistor 34 and the value of resistor 36 in combination with that of resistor 22. Base biasing is established by the value of resistor 26 in combination with that of the feedback resistor 24. Resistor 40 is varied to precisely choose the output impedance which is presented to the SAW filter 106, and resistor 46 is chosen to attain an input impedance which matches the impedance of the cable 14. Resistors 22 and 24 are chosen so that the tuner, preamplifier, I.F. circuits, and video amplifier will have a desired gain for the entire system. Once the A.C. characteristics of the preamplifier have been established by the choice of the resistors 22 and 24, the value of resistor 36 is chosen to pick a desired operating point on the load line of FIG. 4. Varying this resistor moves the operating point up and down along the load line. The operating point is located at that point which produces the greatest collector voltage swing within the linear operating range of the transistor 20. Proper choice of the value of this resistor will minimize the amount of intermodulation distortion in the preamplifier under strong signal conditions. After the proper D.C. bias conditions have been established, resistors 46 and 40 may be adjusted to achieve precise input and output impedances for the preamplifier, if necessary.

The preamplifier of FIG. 1 readily lends itself to simple adjustment if different operating conditions are desired. For instance, it may be desired to increase the gain of the preamplifier, while maintaining the input and output impedances constant. To do this, the value of the degeneration resistor 22 is reduced, which increases the gain, but also reduces the input and output impedances of the preamplifier. Accordingly, the value of the feedback resistor 24 is increased, which also increases the gain of the preamplifier, but increases the input and output impedances of the preamplifier. There is a range of adjustment over which the gain of the preamplifier may be varied in this manner, while the impedance decreases and increases will offset each other, obviating the need for final impedance adjustment. Increasing the value of resistor 24 will alter the D.C. bias by lowering the voltage at the base of the transistor, but this may be corrected by increasing the value of resistor 26 or, alternatively, reducing the value of resistor 36. If necessary, the values of resistors 46 and 40 may be adjusted to fine tune the input and output impedances of the preamplifier.

The SAW filter will exhibit a response characteristic which attenuates the adjacent channel sound carrier of the I.F. signal by 40 to 50 db relative to center band. To minimize the amount of intermodulation distortion caused by this attenuated signal, and to allow for the effects of mistuning and signal bypassing of the SAW filter by means of other, undesired signal paths, it is often desirable to attenuate the adjacent channel sound carrier by at least 55 db relative to center band. Additional trapping of the adjacent channel sound carrier is provided by the tuned circuit 50 of the preamplifier of FIG. 2, in which the remaining components are the same as those shown in FIG. 1, and bear the same reference numerals. The tuned circuit 50 includes a capacitor 52 coupled to the collector of transistor 20, and the parallel combination of a capacitor 54 and an inductor 56 coupled between capacitor 52 and ground. The capacitors 52 and 54 and the inductor 56 are tuned to provide an additional ten to fifteen db of attenuation at the adjacent channel sound carrier frequency, which is 47.25 MHz in the NTSC system. Additionally, the tuned circuit 50 tunes with the inductor 30 to develop a pole at approximately 45 MHz in the characteristic response of the preamplifier, which provides a further feature.

In the NTSC and other television systems, the video information is transmitted as what is known as a vestigial sideband signal. Lower frequency video information is transmitted as a double sideband signal, and higher frequency information is transmitted single sideband. Typical passband shaping circuits in an NTSC I.F. system locate the picture carrier and its double sidebands on the upper vestigial slope of the characteristic response, and the single sideband signals occupy the center of the passband. An idealized I.F. response characteristic is shown as waveform 220 in FIG. 5. The picture carrier is located at 45.75 MHz, and the double sideband information extends outward from the picture carrier, to 45 MHz and to 46.5 MHz. The vestigial slope portion of the passband declines linearly so that the picture carrier amplitude is six db lower than the signal level at 45 MHz, and is six db above the end of the double sideband signal at 46.5 MHz. Upon detection, the energy of the double sidebands will be combined to produce a flat baseband response characteristic.

However, an actual I.F. vestigial response characteristic, and specifically, that of the typical SAW filter, is not ideal, but is rounded, as illustrated by broken line 222 of FIG. 5. This rounded vestigial slope will produce a dip in the response characteristic of the detected baseband signal at the junction of the double and single sideband portions, as shown in FIG. 6. The rounded passband 222 of FIG. 5 will result in a response characteristic at the output of the video detector which exhibits a fishtail-shaped envelope 232 as shown in FIG. 6.

Figure 2:
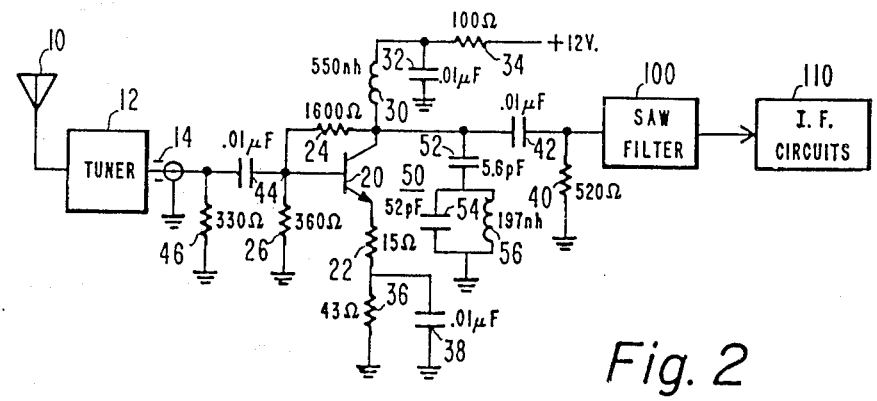
FIG. 2 illustrates, in schematic diagram form, a SAW filter preamplifier in accordance with the present invention which includes a tuned circuit at its output.

The undesirable fishtail envelope is reduced by use of the arrangement of FIG. 2. The inductor 30 tunes with the input capacitance of the SAW filter so as to exhibit a broad, low Q response characteristic centered about the center of the I.F. passband. This response characteristic is modified by the effect of tuned circuit 50, which exhibits a zero at 47.25 MHz and, in combination with inductor 30, a pole at 45 MHz. The composite response characteristic of the preamplifier is shown as response curve 242 in FIG. 7.

The SAW filter has a rounded characteristic response, which is shown as response curve 240 in FIG. 7. The characteristic response at the output of the SAW filter 100 is the product of these two characteristics, which is illustrated as response curve 250 in FIG. 7. Response curve 250 is seen to exhibit a much more linear response on the vestigial slope portion of the curve, between 45 and 46.5 MHz, which reduces the fishtailing effect which would result from response curve 240 alone. In addition, response curve 250 exhibits increased attenuation at the adjacent channel sound carrier frequency of 47.25 MHz.

Figure 3:
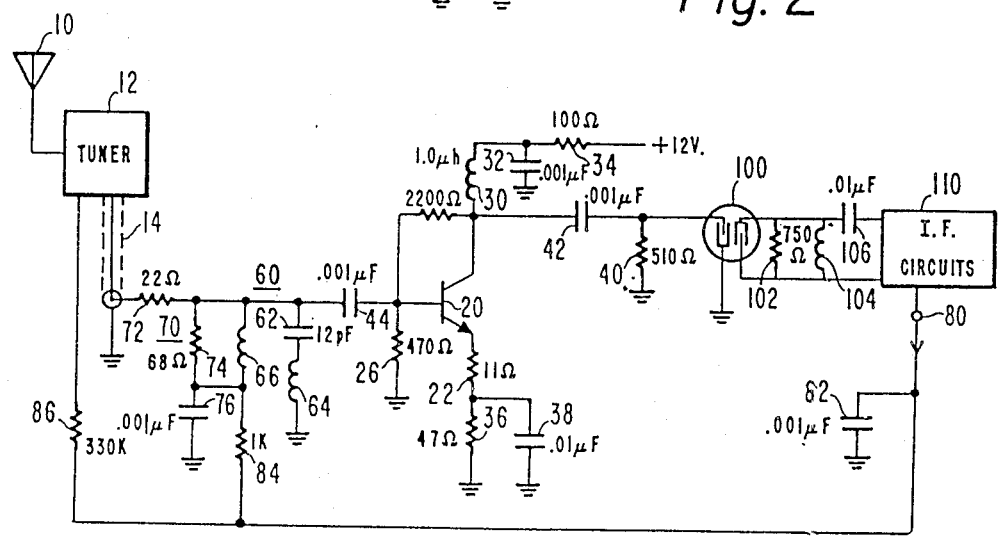
FIG. 3 illustrates, partially in block diagram form and partially in schematic diagram form, the tuner and I.F. signal processing section of a television receiver, including a SAW filter preamplifier of the present invention which includes a tuned circuit at its input.

The coupling of the tuned circuit 50 at the output of the preamplifier as shown in FIG. 2 is advantageous in that the effects of the tuned circuit 50 are substantially buffered from the input of the preamplifier by the transistor 20, and thus have only a minimal effect on the impedance at the input of the preamplifier. The tuned circuit may be located at the input of the preamplifier, however, if adequate padding is utilized. Such an arrangement is shown in FIG. 3. A tuned circuit 60 includes the series combination of a capacitor 62 and an inductor 64, coupled between the input of the preamplifier and ground and tuned to the frequency of the adjacent channel sound carrier signal. An inductor 66 is coupled in parallel with capacitor 62 and inductor 64 to develop a pole in the response characteristic at the input of the preamplifier at the junction of the single and double sideband portions of the I.F. signal passband. A resistor 72 is in series with the signal path between the cable 14 and the tuned circuit 60, and a resistor 74 is coupled in parallel with the inductor 66. Resistors 72 and 74 comprise a three db pad 70 at the input of the preamplifier which buffers the effects of the tuned circuit 60 from the cable 14 and the tuner 12.

An output circuit for the SAW filter 100 is shown in FIG. 3, and includes a resistor 102 and an inductor 104 coupled in parallel with the output transducer of the SAW filter. I.F. signals at the output of the SAW filter 100 are applied to the I.F. circuits 110 from the output transducer by a coupling capacitor 106 coupled in series with the output signal path.

The I.F. circuits produce an R.F. AGC voltage at a terminal 80, which is used to control the gain of the R.F. amplifier in the tuner 12. The R.F. AGC voltage is filtered by a capacitor 82 at the terminal 80, and is coupled to the tuner by a resistor 86. The R.F. AGC voltage may also be applied to the tuner by the I.F. signal path by way of a resistor 84, inductor 66, resistor 72, and cable 14. When applied to the tuner 12 in this manner, the R.F. AGC voltage may be tapped off of the signal path, further filtered, and applied to the R.F. amplifier. Either R.F. AGC path, or both, may be used, depending upon the requirements of the tuner being used.

The use of the input pad 70 and tuned circuit 60 at the input of preamplifier provides the impedance match required for the cable 14, thereby eliminating the need for resistor 330 and input impedance balancing if the gain of the preamplifier is altered. But, as indicated above, the pad 70 does attenuate the I.F. input signal by about three db, which loss must be accommodated by the tuner, preamplifier and I.F. system. As in FIG. 2, the inductor 30 of FIG. 3 tunes with the input capacitance of the SAW filter 100 to create a low Q tuned circuit tuned to the center of the I.F. passband. The operation of the configurations of FIGS. 2 and 3 is thus virtually the same.

What is claimed is:

1. In a television receiver including a tuner for receiving radio frequency television signals and producing intermediate frequency signals at an output at a first impedance level, and a surface acoustic wave filter, having an input, and exhibiting a characteristic response defining an intermediate frequency passband including desired ones of said intermediate frequency signals and having a given input impedance; a preamplifier coupled between the output of said tuner and the input of said surface acoustic wave filter comprising:
   a transistor having base, emitter, and collector electrodes;
   a degeneration resistor coupled between said emitter electrode and a point of reference potential;
   an inductor coupled between a source of supply potential and said collector electrode;
   a load resistor coupled between the collector electrode of said transistor and a point of signal reference potential;
   a feedback resistor coupled between said collector and base electrodes;
   a fourth resistor coupled between said base electrode and a point of reference potential;
   means for coupling said base electrode to the output of said tuner for receiving said intermediate frequency signals; and
   means for coupling said collector electrode to the input of said surface acoustic wave filter,
   wherein said resistors bias said transistor so as to amplify said intermediate frequency signals in a substantially distortionless manner and said preamplifier exhibits an input impedance which substantially matches said first impedance and an output impedance which is substantially less than said given input impedance of said surface acoustic wave filter.

2. The television receiver of claim 1, wherein said feedback resistor and said degeneration resistor values are chosen to provide a desired amount of gain in said preamplifier, and to provide, in combination with said load resistor, said output impedance which is substantially less than said given input impedance to reduce triple transit distortion in said surface acoustic wave filter, and
   said fourth resistor value is chosen in combination with that of said feedback resistor to provide desired base biasing for said transistor, and to provide said input impedance which substantially matches said first impedance.

3. The television receiver of claims 1 or 2, wherein said preamplifier further comprises a fifth resistor coupled between said degeneration resistor and said point of reference potential and a first capacitor coupled in parallel with said fifth resistor,
   wherein the value of said fifth resistor is chosen to determine the D.C. biasing and the transistor operating point of said preamplifier.

4. The television receiver of claim 3, wherein said preamplifier further comprises a sixth resistor coupled between said inductor and said source of supply potential.

5. The television receiver of claim 4, wherein said preamplifier further comprises a second capacitor coupled between the junction of said inductor and said sixth resistor and a point of reference potential for filtering said supply potential.

6. The television receiver of claims 1 or 2, wherein said preamplifier further comprises an input impedance adjusting resistor coupled in parallel with said fourth resistor.

7. The television receiver of claim 6, wherein said means for coupling said base electrode to the output of said tuner comprises a third capacitor coupled between said input impedance adjusting resistor and said fourth resistor, and said means for coupling said collector electrode to the input of said surface acoustic wave filter comprises a fourth capacitor coupled between said collector electrode and the junction of said load resistor and the input of said surface acoustic wave filter.

8. In a television receiver including a tuner for receiving radio frequency television signals and producing desired and undesired intermediate frequency signals at an output, and a surface acoustic wave filter, having an input, and exhibiting a characteristic response defining an intermediate frequency passband including desired ones of said intermediate frequency signals and having a vestigial slope portion and a single sideband portion; a preamplifier coupled between the output of said tuner and the input of said surface acoustic wave filter comprising:
   a transistor having base, emitter, and collector electrodes;
   means for connecting said transistor in a common emitter amplifier configuration which provides a desired level of amplification to intermediate frequency signals applied to said base electrode and produces amplified intermediate frequency signals at said collector electrode;

means for coupling said output of said tuner to said base electrode;

means for coupling said collector electrode to the input of said surface acoustic wave filter; and a tuned circuit, coupled between said collector electrode coupling means and a point of signal reference potential and tuned to exhibit a characteristic response having a pole located approximately at the frequency of intersection of said vestigial slope portion and said single sideband portion of said intermediate frequency passband.

9. The television receiver of claim 8, wherein said tuned circuit is further tuned to provide attenuation at the intermediate frequency of an adjacent channel sound carrier signal.

10. The television receiver of claim 9, wherein said tuned circuit includes an inductor which cooperates with the input capacitance of said surface acoustic wave filter to provide a response characteristic having a center frequency located within said intermediate frequency passband.

11. The television receiver of claim 9, wherein said tuned circuit comprises first and second capacitors serially coupled between said collector electrode and said point of signal reference potential, a first inductor coupled in parallel with said second capacitor, and a second inductor coupled between said collector electrode and a point of reference potential.

12. The television receiver of claim 11, wherein said first and second capacitors and said first inductor are tuned to provide attenuation at said intermediate frequency of said adjacent channel sound carrier signal, and said first and second capacitors and said first and second inductors are tuned to provide said characteristic response having said pole located approximately at said frequency of intersection of said vestigial slope portion and said single sideband portion of said intermediate frequency passband.

13. In a television receiver including a tuner for receiving radio frequency television signals and producing desired and undesired intermediate frequency signals at an output, and a surface acoustic wave filter, having an input, and exhibiting a characteristic response defining an intermediate frequency passband including desired ones of said intermediate frequency signals and having a vestigial slope portion and a single sideband portion; a preamplifier coupled between the output of said tuner and the input of said surface acoustic wave filter comprising:

a transistor having base, emitter, and collector electrodes;

means for connecting said transistor in a common emitter amplifier configuration which provides a desired level of amplification to intermediate frequency signals applied to said base electrode and produces amplified intermediate frequency signals at said collector electrode;

means for coupling said output of said tuner to said base electrode;

means for coupling said collector electrode to the input of said surface acoustic wave filter; and a tuned circuit, coupled between said base electrode coupling means and a point of signal reference potential and tuned to exhibit a characteristic response having a pole at approximately the frequency of intersection of said vestigial slope portion and said single sideband portion of said intermediate frequency passband.

14. The television receiver of claim 13, wherein said tuned circuit is further tuned to provide attenuation at the intermediate frequency of an adjacent channel sound carrier signal.

15. The television receiver of claim 14, further including an attenuating network coupled between said tuner and tuned circuit.

16. The television receiver of claim 14, wherein said preamplifier further includes an inductor coupled between the collector electrode of said transistor and a source of supply potential and tuned in cooperation with the input capacitance of said surface acoustic wave filter to provide a characteristic response having a center frequency located within said intermediate frequency passband.

17. The television receiver of claim 14, wherein said tuned circuit comprises the serial combination of a first capacitor and a first inductor coupled between said base electrode coupling means and said point of signal reference potential for providing said attenuation at said intermediate frequency of said adjacent channel sound carrier signal, and a second inductor, coupled in parallel with said serial combination and tuned in cooperation therewith to provide said characteristic response having said pole at approximately the intersection of said vestigial slope portion and said single sideband portion of said intermediate frequency passband.

18. In a television receiver including a tuner for receiving radio frequency television signals and producing desired and undesired intermediate frequency signals at an output, and a surface acoustic wave filter, having an input, and exhibiting a characteristic response defining an intermediate frequency passband including desired ones of said intermediate frequency signals and having a vestigial slope portion and a single sideband portion; a preamplifier coupled between the output of said tuner and the input of said surface acoustic wave filter comprising:

a transistor having base, emitter, and collector electrodes;

means for connecting said transistor in a common emitter amplifier configuration which provides a desired level of amplification to intermediate frequency signals applied to said base electrode and produces amplified intermediate frequency signals at said collector electrode;

means for coupling said output of said tuner to said base electrode;

means for coupling said collector electrode to the input of said surface acoustic wave filter; and a tuned circuit, coupled to one of said coupling means, and tuned to provide a response characteristic at the input of said surface acoustic wave filter which exhibits maximum attenuation at the intermediate frequency of an adjacent channel sound carrier signal, and a pole at approximately the frequency of intersection of said single sideband portion and said vestigial slope portion of said passband.

19. In a television receiver including a tuner, for receiving radio frequency television signals and producing intermediate frequency signals at an output at a first impedance level, and a surface acoustic wave filter, having an input, and exhibiting a characteristic response defining an intermediate frequency passband having a vestigial slope portion and a single sideband portion and having a given input impedance; a preamplifier coupled between the output of said tuner and the input of said surface acoustic wave filter comprising:

a transistor having a base, emitter, and collector electrodes;

a degeneration resistor coupled between said emitter electrode and a point of reference potential;

an inductor coupled between a source of supply potential and said collector electrode;

a load resistor coupled between the collector electrode of said transistor and a point of signal reference potential;

a feedback resistor coupled between said collector and base electrodes;

a fourth resistor coupled between said base electrode and a point of reference potential;

means for coupling said base electrode to the output of said tuner for receiving said intermediate frequency signals;

means for coupling said collector electrode to the input of said surface acoustic wave filter; and a tuned circuit, coupled to one of said coupling means, and tuned to exhibit a characteristic response having a zero at the intermediate frequency of an adjacent channel sound carrier signal, and a pole at approximately the frequency of intersection of said vestigial slope portion and said single sideband portion of said intermediate frequency passband;

wherein said resistors bias said transistor so as to amplify said intermediate frequency signals in a substantially distortionless manner and said preamplifier exhibits an input impedance which substantially matches said first impedance and an output impedance which is substantially less than said given input impedance of said surface acoustic wave filter.

* * * * *